Aug. 10, 1943.　　　A. M. THOMSEN　　　2,326,266
INTERNAL COMBUSTION AND APPARATUS THEREFOR
Filed Feb. 2, 1942　　　3 Sheets-Sheet 1

INVENTOR.
Alfred M Thomsen

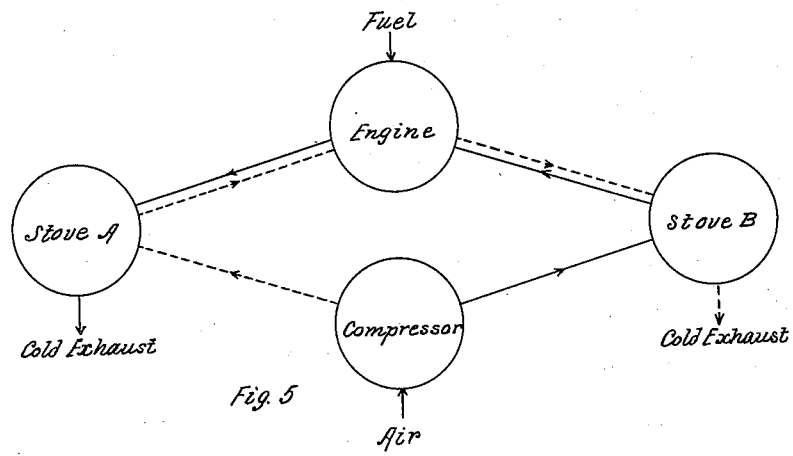
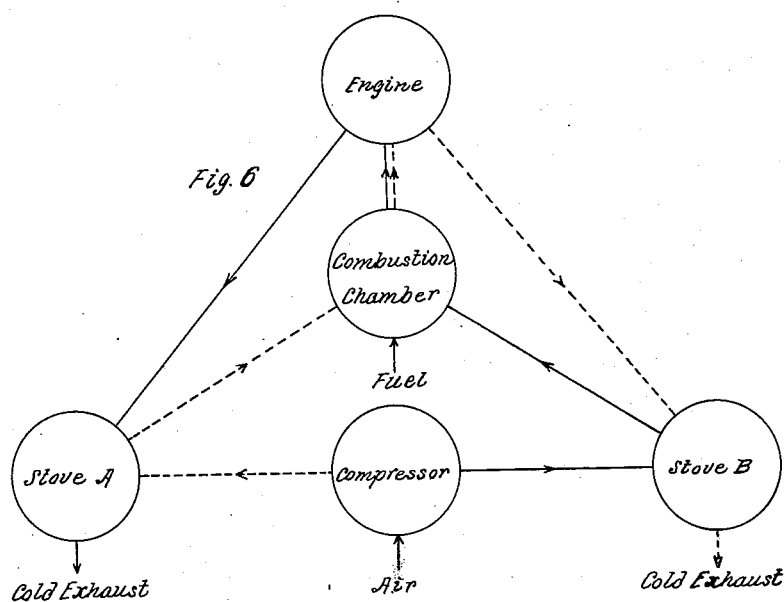

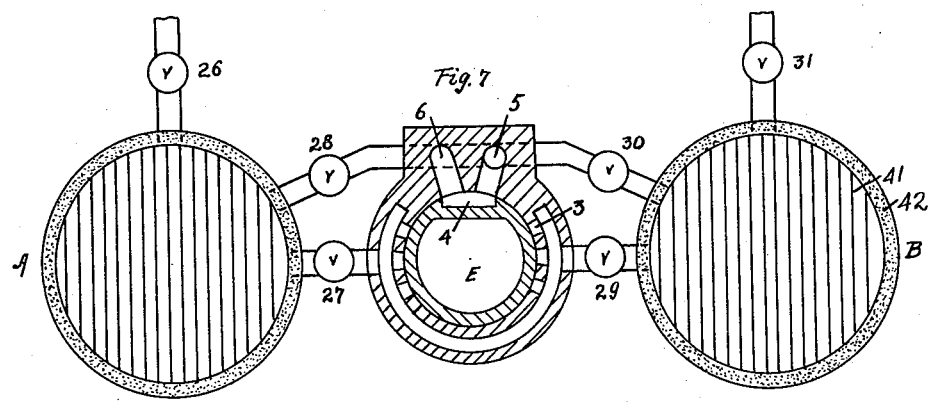
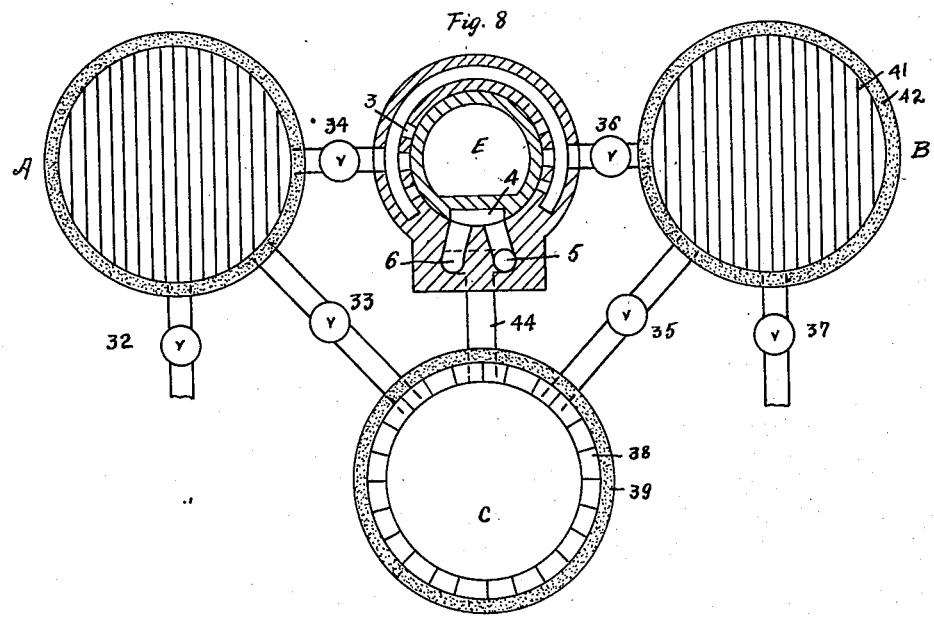

Patented Aug. 10, 1943

2,326,266

UNITED STATES PATENT OFFICE 2,326,266

INTERNAL COMBUSTION AND APPARATUS THEREFOR

Alfred M. Thomsen, San Francisco, Calif.

Application February 2, 1942, Serial No. 429,236

6 Claims. (Cl. 123—59)

My invention deals in general with an improvement in design of the internal combustion motor whereby its functions become so augmented that it serves the purpose of converting heat energy into mechanical energy to better advantage and with greater efficiency than is now considered standard.

Many proposals have been made in the past by other inventors that are fundamentally sound and would involve considerable improvement in the heat cycle of the present engine but mechanical difficulties in engine design have made them inoperative. For practical purposes, the internal combustion motor of today may be considered as a non-heat recuperative motor operating on either a two or four cycle plan. My invention would seem at first glance to be a development of the two cycle principle, and it can be operated as such, but later on it will appear that by taking advantage of certain inherent virtues in the design it can be used as an all purpose heat engine in the broadest sense of the word.

Figure 1:
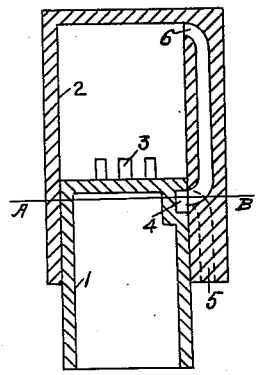
Figure 2:
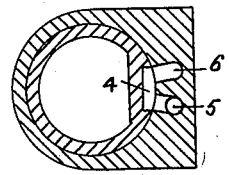
Figure 3:
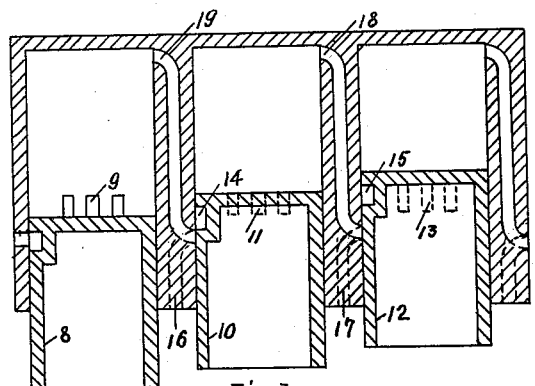
Figure 4:
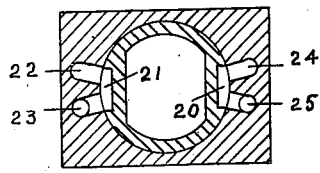

Considered as a two-cycle engine, operating on the Diesel principle, my invention can best be scanned or described by referring to the attached drawings where Fig. 1 represents a section through the vertical axis and Fig. 2 a section through the line AB of Fig. 1. Fig. 3 shows a bank of 3 cylinders illustrating the control of a cylinder by the valve action of the piston in the adjacent cylinder. Fig. 4 shows the use of a channelled piston for admitting both air and fuel separately. Fig. 5 is a diagrammatic representation of two heating stoves in series with a compressor-engine assembly. Fig. 6 is a similar diagrammatic representation with the addition of a separate combustion chamber. Fig. 7 is a combination of an engine, represented by a single cylinder, interposed between two heating stoves. Fig. 8 shows the same combination with the addition of a separate combustion chamber. Both latter views are in section and the compressor is eliminated from the drawing as it evidently is quite conventional.

For the sake of clarity all unnecessary elements in the engine have been eliminated only those being retained which are essential to a correct understanding of the underlying alterations from standard technique. This includes the elimination of such absolute essentials in any internal combustion motor as water jackets and all moving parts except the piston itself.

In Fig. 1, the piston 1 is represented at the bottom of its stroke within the cylinder 2, the exhaust ports 3 being completely unsealed by this action of the piston. In this position a pocket or passage within the piston 4 serves as a means of connection to two passages within the cylinder wall itself numbered respectively 5 and 6. This particular combination is best seen in Figure 2, which is a section through the line AB of Fig. 1.

In operation, compressed air is continuously applied to the lower opening of passage 5, so when the piston is in proper position it will afford a means whereby said compressed air can reach the top of the cylinder through the passage way 6. To illustrate: Let the piston 1 be descending and placed say half way of its stroke then there will evidently be no connection between the passages 5 and 6, and the piston will be uninfluenced by the presence of either passages or the piston pocket.

As soon, however, as the exhaust ports 3 become partially unsealed there will also be established a small connection between passages 5 and 6 and if the pressure of the compressed air be sufficient a small amount of fresh air will be sent into the top of the cylinder. If the pressure of the compressed air supply be inadequate then the reverse action will follow and products of combustion will flow into the ducts 5 and 6 until the pressure within the working cylinder drops, by the opening of the exhaust ports for a sufficient length of time, after which the flow of compressed air will be resumed in the normal direction as previously described.

In the description so far it is assumed that the length of the exhaust ports and the vertical height of the "pocket" in the piston are of the same size. It is thus indicated on the drawing. It could, of course, be different. If it were made smaller than the exhaust ports then no back flow would become possible as the pressure within the working cylinder would have been released, at least in part, before the connection between 5 and 6 would have become established. On the other hand, the period for the flow of compressed air would become correspondingly shortened and thus the danger of poor scavenging would become imminent.

If the vertical height of the "pocket" were made greater than vertical height of the exhaust port, then said pocket would act as a supplementary exhaust port and products of combustion would flow against the stream of compressed air until after the exhaust ports had become unsealed for a sufficient length of time so nothing would be gained by this type of adjustment.

From the standpoint of efficiency, therefore, the study of Fig. 1 and Fig. 2 is rather a study of shortcomings than of advantages. In modern practice both the four-cycle and two-cycle engines are an assembly of "compromises." Each type has certain definite advantages over the other but such advantages are in turn balanced by sundry disadvantages so that the question of which is really the best must be solved in each individual case by a full consideration of all the pros and cons.

The same is true in this case. Certain disadvantages over the present two-cycle engine are apparent without compensating advantages. This aspect is entirely changed when we consider an assembly of a multi-cylinder engine in which the work within a cylinder is governed, not by the position of the contained piston but instead by the position of another piston in the series. This combination is illustrated in Fig. 3.

In this diagram the position of the initial piston 8 is at the bottom of the stroke as in the last mentioned drawing, Fig. 1. After that, each succeeding piston of the series is represented by an advance in position over the initial one of the distance corresponding to an arc of 30°. This allows of an arc of 60° from the time the exhaust ports commence to open until they are once more completely closed. The admission of air to the cylinder within which piston 8 moves, at the point marked 19, is thus seen to be governed by the position of the piston 10 whose pocket 14 serves as the connection between passages 16 and 19 with compressed air being supplied at 16.

In an identical manner the air supply for the cylinder within which piston 10 moves is governed by the position of the pocket 15 within the piston 12 which in its proper position affords connection between the air passages 17 and 18, compressed air being supplied at 17. In each cylinder the exhaust ports are functioning in the conventional manner being opened and sealed by the movement of the respective pistons.

As the spacing between each cylinder is equivalent to an arc of 30° it follows that 12 cylinders would be required to absorb the entire differential and to permit of the first piston in the series being serviced by the last.

Similarly, the size of the pockets 14 and 15 can now be increased at will and by varying both the spacing, the position and the size of the respective pockets any desired effect can be produced without any possible interference such as was discussed under the arrangement in Fig. 1. The designer thus has the utmost latitude in meeting any special demand.

In operation the assembly as illustrated in Fig. 3 will function as follows: Let the piston 8 be moved to a position of about half-way of its stroke and be descending, the remaining pistons being arranged to correspond. As soon as the exhaust ports 9 begin to open the pressure drops but there will be no flow of air to the top of the corresponding cylinder until the piston has reached the bottom of its stroke with the exhaust ports fully uncovered. Scavenging air in steadily increasing volume is now supplied through the instrumentality of piston 10 reaching its maximum when the exhaust ports 9 are fully covered. If all details are properly proportioned it will manifestly be possible to so time this maneuver as to give the products of combustion full time to escape and to replace them with scavenging air.

But when the exhaust ports are fully covered by the piston 8 in its ascending path, piston 10 will just have reached its lowest position and hence a free flow of compressed air will be effective to the space above piston 8. This flow will steadily decrease partly due to the closing of the port at 14 and partly due to the increased resistance of the back pressure in the space above piston 8. Nevertheless, it will not cease entirely until the port 14 is completely closed, that will mean until the piston 10 has ascended an amount equivalent to a 30° arc. If the design of the piston be now altered by lengthening 14 and placing it a little lower in the piston to correspond with the former opening, then more leeway will be provided for building up pressure in the cylinder above piston 8 to any extent desired.

So far attention has been focused solely upon the admission of air but it will be evident that fuel can be serviced in the same manner. This is indicated at Fig. 4, where 20, 24 and 25 indicate the air circuit as already described while 21, 22, and 23 indicate the corresponding passages for fuel. The adjustments indicated in the case of air evidently apply equally to the fuel circuit so ignition can be placed where desired.

The foregoing would result in a truly valveless engine, as all functions within the working cylinder would be controlled by the movement of pistons leaving out all moving parts save connecting rods and crank shaft, the ultimate in simplicity of design. The same applies to ignition, for if the compression be placed so high as to produce spontaneous ignition then such ignition will follow directly upon the admission of fuel.

Having now described the mechanism of the engine I will next call attention to sundry applications in practice which become not merely possible but eminently practical. The first is its use as a "hot air" or "caloric" engine. The economy introduced in the compressed air engine, of any type, by preheating its air is too well known to call for description. The difficulty is the heating of the air to any degree worth while except by burning fuel therein.

If this be adopted as the plan, making it a type of an internal combustion motor, then the fault becomes the virtual impossibility of making valves stand up against the gruelling treatment they will be receiving, hence the confining of the functions of compression and heating to the working cylinder of the engine, the only practical way so far. This has, in fact, been the development of the orthodox internal combustion motor of today.

That my engine will run perfectly, with due regard to expansion of the working fluid is self evident. It could evidently be used as a steam engine were that desired. It can consequently be used on compressed air without any reheating, or if a separate combustion chamber be included it can operate on air heated to any degree desired. Its greatest use, however, will be represented by the extent to which heat recuperation can be achieved through its use. It is a well known fact that only one third of the heat value of fuel is converted into energy in the internal combustion motor and that another third is represented in the exhaust with the jacket water taking up the balance. In large engines the exhaust loss is augmented.

To conserve this loss in the exhaust and to return it to the engine has been attempted again and again, but so far as I know without any conspicuous success. The difficulties are as follows: If the exhaust be used to heat the incoming air to the working cylinder then there is a great loss in power output by the engine as the air expanded by heat weighs less and hence will burn less fuel. This can be corrected by a separate compression before heating so that the weight of air is equalized but the corresponding wear and tear on valves becomes prohibitive. Finally, fuel cannot be commingled with heated air without danger of premature ignition.

The last impediment virtually limits the use of heat recuperation to the Diesel type of engine where a highly heated, compressed air volume is desired before the injection of fuel commences. The second impediment is evidently met by my valveless engine and the first by adequate compression which in this case is a mandatory provision of the engine operation. By the use of this type of engine, therefore, the heat now lost in the exhaust can be returned to the engine cylinder with definite benefit.

The heating of one gaseous fluid by means of another in counter-current flow but separated from one another by a conducting metallic wall is exceedingly inefficient from an economic standpoint. The film of virtually stagnant gas in contact with the metallic wall is the chief obstacle and there seems to be no way of improving this heat transfer save by increased velocity which in turn demands more power loss through skin friction.

I prefer to employ the principle so universally employed in heat recuperation in the industries that use high temperature furnaces, namely the "checker" and "stove" principle. For a specific time I pass the exhaust into what is to all effect an accumulator and then I discharge said accumulator by passing the cold compressed air through same in the opposite direction.

This combination is illustrated in Fig. 5. Following the solid line from the compressor to the stove B and then to the engine, the air becomes heated in transit and reaches the engine cylinder with considerable recovered heat while the loss in weight due to expansion by heat is compensated for by adequate compression. Additional heat is then generated by combustion of fuel within the engine and heat is lost from same partly by conduction through the cylinder walls and partly in doing useful work. The residual heat not thus accounted for manifestly remains in the exhaust gases and is extracted from same in their passage through the stove A, yielding as the final product a cold exhaust.

The reversed flow is indicated by the dotted line. The heat being stored in stove A is now transferred to the engine and the exhaust gases in turn heat the stove B, compensating it for the heat previously lost, thus establishing a complete cycle. There will evidently be no loss of engine power, but if the fuel be kept the same there will be a corresponding increase in pressure within the working cylinder and a higher temperature of the exhaust. As these items, in any well proportioned engine, are already as high as is warranted by the strain on the materials of construction it follows that such increase cannot be tolerated but that instead the input of fuel will be decreased with consequent fuel economy.

It has already been stressed that my engine, due to its construction features, can be operated with a separate combustion chamber, the working cylinder performing no function save to permit the expanding fluid to convert a portion of its energy to useful work. This combination is illustrated in Fig. 6, where the solid lines and the dotted lines, respectively, represent the normal and the reversed flow of the working fluid. In view of what has already been said in describing Fig. 5, the diagram should be found self-explanatory.

The special advantage of the separate combustion chamber resides in the increased flexibility of operation thus imparted to the engine while the advantage of heat recuperation is fully retained. These combinations are more fully elucidated in Fig. 7 and Fig. 8, both of which are in section. The stoves A, and B, are represented as having vertical plates of metal or refractories enclosed within an insulated envelope 42, the plates being designated as 41. In operation compressed air enters by the valve 26 and passes by the valve 28 into the cylinder of the engine which in this case serves both as a combustion and as an expansion chamber and is designated by the letter E. The products of combustion then leave the cylinder by the exhaust ports 3 and the valve 29 into the stove B where they impart the major part of their heat to the packing 41, and leave in cooled condition by the valve 31. During this cycle it is evident that the valves 27 and 30 must remain closed.

These two valves are now opened and valves 28 and 29 are in turn closed. Compressed air is now permitted to enter by 31 instead of by 26 as before, and hence becomes heated in its passage through the stove B by the heat stored therein from the exhaust gases that previously traversed it. Thus heated, it is admitted to the engine by the valve 30 and leaves the engine by the valve 27. The heat resident in the exhaust gases then leave their surplus heat in the stove A, and leave by the valve 26, having restored said device to its former temperature.

Fig. 8, is identical with Fig. 7, which has just been described, except that a separate combustion chamber C has been interposed between the stoves A and B and the engine E, leaving the cylinder of said engine but one function namely expansion. The operation then proceeds as follows: Compressed air enters by the valve 32, is heated in stove A and passes by the valve 33 into the combustion chamber C. Here it encounters fuel and has its temperature correspondingly enhanced, leaving for the engine by the duct 44. Meanwhile the valves 34 and 35 manifestly must remain closed. The exhaust of the engine then leaves by the valve 36 for the stove B and leaves in cooled condition by the valve 37. Upon reversal of flow, air will enter by 37, the valves 34 and 35 will be opened, the valves 33 and 36 will be closed, enter the combustion chamber by 35 and pass to the engine as before. The exhaust will then leave by 34, heat the stove A, and leave by 32. The combustion chamber is represented as having a layer of insulation, 39, and an inner brick lining, 38, but such matters are evidently optional.

Having thus fully described both my engine and its application to power production, I claim:

1. The method of converting fuel into mechanical energy which comprises; burning the fuel in pre-heated and pre-compressed air within an internal combustion motor; storing the heat resident in the exhaust gases in a series of accumulators; periodically reversing the flow through such accumulators and heating the pre-compressed air in its passage to the engine by means of the heat stored in said accumulators.

2. The method of converting fuel into mechanical energy which comprises; burning the fuel in pre-heated and pre-compressed air within an internal combustion motor having a combustion chamber separate and distinct from the expansion chamber of the enegine; storing the heat resident in the exhaust gases in a series of accumulators; periodically reversing the flow through such accumulators and heating the pre-compressed air in its passage to the engine by means of the heat stored in said accumulators.

3. A heat-recuperative internal combustion motor assembly which comprises; a prime-mover, proper, in which the fuel is burned; a charging heat accumulator connected to and heated by the exhaust of said prime-mover; a discharging heat-accumulator, previously charged by means of said exhaust from said prime-mover; means for compressing air and for transferring said compressed air through the discharging heat accumulator to the prime-mover, proper; means for periodically reversing the flow through said heat accumulators; and means for interconnecting the various individual items thus enumerated into one assembly.

4. A heat-recuperative internal combustion motor assembly, as set forth in claim 3, the prime-mover therein specified having a cylinder and a reciprocating piston, a channel within said piston serving in a predetermined position as a connection between otherwise separated portions of the air channel from the accumulator.

5. A heat-recuperative internal combustion motor assembly which comprises; a prime-mover, proper, having a combustion chamber separate and distinct from the expansion chamber of the engine; a charging heat-accumulator connected to and heated by the exhaust of said prime-mover; a discharging heat-accumulator, previously charged by means of said exhaust from said prime-mover; means for compressing air and for transferring said compressed air through the discharging accumulator to the prime-mover, proper; means for periodically reversing the flow through said heat-accumulators; and means for interconnecting the various individual items thus enumerated into one assembly.

6. A heat-recuperative internal combustion motor assembly, as set forth in claim 5, the prime-mover therein specified having in addition to the separate combustion chamber a cylinder and a reciprocating piston, a channel within said piston serving in a predetermined position as a connection between otherwise separate portions of the air channel from the discharging heat accumulator.

ALFRED M. THOMSEN.